(12) United States Patent
Heindl

(10) Patent No.: US 8,281,890 B2
(45) Date of Patent: Oct. 9, 2012

(54) DRIVE SYSTEM FOR VEHICLES WITH AT LEAST TWO DRIVABLE VEHICLE AXLES

(75) Inventor: Richard Heindl, Marktoberdorf (DE)

(73) Assignee: AGCO GmbH, Marktoberdorf (DE)

( * ) Notice: Subject to any disclaimer, the term of this patent is extended or adjusted under 35 U.S.C. 154(b) by 1036 days.

(21) Appl. No.: 12/116,809

(22) Filed: May 7, 2008

(65) Prior Publication Data
US 2008/0277182 A1 Nov. 13, 2008

(30) Foreign Application Priority Data
May 9, 2007 (DE) .......................... 10 2007 021 732

(51) Int. Cl.
*B60K 8/00* (2006.01)
(52) U.S. Cl. .................. 180/242; 180/248; 180/249
(58) Field of Classification Search .................. 180/233, 180/245, 246, 247, 248, 249, 250, 242, 243
See application file for complete search history.

(56) References Cited

U.S. PATENT DOCUMENTS

| | | | | |
|---|---|---|---|---|
| 6,604,596 | B2 * | 8/2003 | Bracke et al. ................. | 180/242 |
| 7,201,266 | B2 * | 4/2007 | Brissenden et al. ....... | 192/85.63 |
| 2006/0102409 | A1 * | 5/2006 | Kamada et al. .............. | 180/249 |

FOREIGN PATENT DOCUMENTS

| | | |
|---|---|---|
| DE | 4209950 | 9/1993 |
| DE | 10260196 | 7/2004 |
| EP | 1270305 | 1/2003 |
| EP | 1990229 | 11/2008 |
| WO | WO 2005009775 | 2/2005 |

OTHER PUBLICATIONS

European Search Report for European Application No. EP08008404 dated Dec. 19, 2008.
German Examination Report for German Application No. 102007021732.5 dated Dec. 10, 2007.

* cited by examiner

*Primary Examiner* — Kevin Hurley

(57) ABSTRACT

The present invention relates to a drive system for vehicles with at least two drivable vehicle axles (V, H), in particular for utility vehicles and farm tractors. The drive system has an infinitely variable transmission with no intermediate axle differential comprising at least a first (11) and a second (12) motor. The first motor (11) in this case is propulsively connected to a first vehicle axle (H) and the second motor (12) is propulsively connected to a second vehicle axle (V). Furthermore the drive system has a clutch (20), by which a propulsive connection can be made between at least the first (H) and the second (V) vehicle axle, wherein the position of the clutch is adjustable (20) in a range between an engaged position and a disengaged position, and a control unit (30), which actuates the clutch (20) in such a manner that its torque transmission capacity is adjusted as a function of a driving state of the vehicle.

28 Claims, 6 Drawing Sheets

DRIVE SYSTEM FOR VEHICLES WITH AT LEAST TWO DRIVABLE VEHICLE AXLES

CROSS REFERENCE TO RELATED APPLICATION

This application is based on, and claims the benefit of priority to, German application DE 10 2007 021 732.5, filed 9 May 2007, which priority application is hereby incorporated by reference.

BACKGROUND OF THE INVENTION

1. Field of Invention

The present invention relates to a drive system for vehicles with at least two drivable vehicle axles, wherein the drive system has an infinitely variable transmission with no intermediate axle differential comprising at least a first and a second motor, wherein the first motor is propulsively connected to a first vehicle axle and the second motor is propulsively connected to a second vehicle axle, and a clutch by which a propulsive connection can be made between at least the first and the second vehicle axle. Furthermore the present invention relates to a method for operating such a drive system.

2. Description of Related Art

Utility vehicles, particularly agricultural utility vehicles, such as for example a farm tractor, frequently have at least two drivable vehicle axles. Also passenger cars, which are designed to travel over wet or smooth roadways and off-road, frequently have two drivable vehicle axles. In the case of such vehicles and particularly over rough terrain, all vehicle axles and thus all wheels can be driven, so that—as is generally known for all-wheel drives—traction is improved as a result.

The German Patent DE 42 09 950 C2 describes a drive system for two-axled vehicles used in agriculture and civil engineering. With this drive system each vehicle axle is assigned at least one hydraulic motor. The two hydraulic motors are driven by a hydraulic pump. The hydraulic pump is driven in turn via a hydrostatic-mechanical power branched transmission by a combustion engine. The hydraulic motors are adjustable independently from one another and thus allow variable rotational speed and torque distribution between front axle and rear axle of the vehicle. Furthermore a switchable clutch enables the front axle and the rear axle of the vehicle to be propulsively connected, so that the two vehicle axles can be driven at a constant rotational speed ratio with the common torque of both hydraulic motors. The switchable clutch is engaged particularly with extremely unequal axle load distribution, so that up to 100% of the possible transmission output torque can be transmitted via a vehicle axle. Thus higher torque than can be made available by the hydraulic motor alone which is propulsively connected to this vehicle axle, is transmitted via a vehicle axle with engaged clutch.

The European Patent EP 1 364 824 A2 describes a control unit for an intermediate axle differential transmission of a vehicle. The intermediate axle differential transmission, which serves to transmit torque to the front wheels and to the rear wheels, comprises an actuator, in particular a tuneable modulating clutch, which adjusts a ratio between the front wheel speed and the rear wheel speed. The actuator in this case is controlled as a function of a steering angle of the front wheels, which is detected by a steering angle sensor.

The intermediate axle differentials, used in road vehicles to obtain a variable translation between the vehicle axles, are usually formed in such a manner that the torque distribution between the vehicle axles is permanently pre-set for all driving speeds and operating conditions. In the case of utility vehicles and farm tractors when traveling over rough terrain extremely unequal axle load distributions develop in some instances. Due to the permanently pre-set torque distribution of these intermediate axle differentials, sufficiently high torque in many cases cannot be supplied to the respective vehicle axle, at which increased traction power demand exists. Accordingly the intermediate axle differentials, often provided in road vehicles, are not suitable for use in vehicles with frequently widely varying axle load distribution, such as for example traction engines and farm tractors.

A drive system, which comprises several hydraulic or electric motors, wherein a motor is propulsively connected to an associated vehicle axle in each case, equally allows variable translation between the vehicle axles. As described in the German Patent DE 42 09 950 C2 for example, the respective motors may be adjustable, so that the torque output of the individual motors can be varied as a function of the traction power demand. The traction power on a highly loaded vehicle axle can be increased by such splitting of the torque output of the individual motors but only up to the maximum torque of the motor, which is propulsively connected to this vehicle axle. Corresponding dimensioning of a step-less drive for each vehicle axle in such a way that traction power can be supplied to this sufficient for utility and agricultural vehicles is not generally possible on the grounds of construction space, efficiency and cost. Therefore utility vehicles, as described in DE 42 09 950 C2 for example, are frequently equipped with switchable clutches, which selectively allow a rigid propulsive connection between the two vehicle axles of the vehicle by engagement of the clutch.

By engaging the switchable clutch and by making the rigid propulsive connection between the vehicle axles however the advantages of variable rotational speed and torque distribution between the vehicle axles, as is possible with disengaged clutch, must be forfeited. Particularly when rounding tight bends the front wheels of the vehicle cover a greater distance than the rear wheels, so that with engaged clutch and thus when there is a rigid propulsive connection between the vehicle axles, tensions in the power train arise.

Accordingly the present invention is based on the object of producing a drive system, of the type indicated above, for vehicles with at least two drivable vehicle axles, by means of which high traction power can be supplied to individual vehicle axles when required and wherein generally the advantages of variable rotational speed and torque distribution between the vehicle axles remain in place.

The object is solved by a drive system according to claim 1 as well as by a method for operating a drive system according to claim 15. Further embodiments of the invention are indicated in the sub-claims.

BRIEF SUMMARY OF THE INVENTION

According to the present invention a drive system is provided for vehicles with at least two drivable vehicle axles. The drive system has an infinitely variable transmission with no intermediate axle differential comprising at least a first and a second motor. The first motor is propulsively connected to a first vehicle axle and the second motor is propulsively connected to a second vehicle axle. Furthermore the drive system has a clutch, by which a propulsive connection can be made between at least the first and the second vehicle axle, wherein the clutch is adjustable in a range between an engaged position and a disengaged position, and a control unit, which actuates the clutch in such a manner that its torque transmission capacity is adjusted as a function of a driving state of the vehicle. The drive system according to the invention is particularly suitable for utility vehicles and agricultural vehicles, such as for example traction engines and farm tractors.

The drive system according to the invention can also be used in vehicles with more than two drivable vehicle axles. In this case for example provision can be made for each vehicle axle to be assigned a corresponding motor. At the same time provision may be made for a propulsive connection to be made between more than just two vehicle axles by the clutch. Alternatively provision may be made for more than one clutch to be provided, wherein a propulsive connection can be made between two vehicle axles respectively by each of the clutches. Furthermore, there is the possibility that in the case of vehicles which comprise more than two drivable vehicle axles, two or more vehicle axles, preferably a twin axle, are propulsively connected to a common engine and are driven at the same rotational speed and torque ratio in each case.

"Propulsive connection" is understood to mean that torque and rotational speed can be transferred between the drive components propulsively connected together. However it is not necessary here that the drive components, propulsively connected together in each case, are directly connected to one another. On the contrary other components, such as for example a clutch, a transmission, etc., through which the torque and the rotational speed can be transferred, may be interposed. Possibly the rotational speed and the torque can be changed by such interposed elements, as is the case for example with a transmission. Also such interposed elements can serve to selectively break the propulsive connection, as is the case with a clutch.

The drive system according to the invention only concerns the distribution of the drive power to the first and the second vehicle axle (and possibly to further vehicle axles) by the first and the second motor. Of course further drive components can be provided on the first and second vehicle axle (and possibly on the further vehicle axles), which for example regulate the distribution of the delivered drive power to the two wheels of the respective vehicle axle. For example the first and/or the second vehicle axle can comprise a drive for driving associated wheels of the vehicle axle, the wheels of the vehicle axle being indirectly driven by the associated motor via this drive. Such drives of the first and/or the second vehicle axle for example can comprise a planetary driveline arranged on the wheel hub and/or a differential, which serves as compensating gear between the respective wheels of a vehicle axle. However the provision of such additional drive components on the respective vehicle axles is not crucial for the distribution, according to the invention, of the drive power to the first and the second vehicle axle (and possibly to further vehicle axles).

According to the invention the drive system has an infinitely variable transmission with no intermediate axle differential. An intermediate axle differential is also frequently described as a central differential and serves to produce variable translation between the vehicle axles. To realize an infinitely variable transmission it is not absolutely essential that the two motors themselves are adjustable. For example the two motors can be formed as non-adjustable hydraulic motors and may be driven by an adjustable hydraulic pump. Alternatively the two motors can also be designed as electric motors.

According to the present invention the clutch can be adjusted with regard to its torque transmission capacity. Preferably the second clutch is a slip clutch in the form of a mechanical friction clutch. In this case a slip clutch non-positively connects two shafts until a limit value for the transmitted torque is reached. If higher torque is applied to the slip clutch, the clutch slips and transfers the maximum torque, which can be transmitted corresponding to the limit value. Due to the adjustability of the torque transmission capacity this limit value may be varied and thus the torque, which can be transmitted by the clutch, may be altered. Furthermore there is a possibility of actuating such clutches by a control unit in such a manner that only a percentage amount of the applied torque is transmitted. Thus the clutch is constantly operated as a "friction clutch", since always only a part of the applied torque is transmitted. For example the control unit can be designed so that the percentage amount transmitted preferably lies in the range from 5%-20% and still more preferably in the range from 8%-12% of the applied torque.

By the provision, according to the invention, of a control unit, which actuates the clutch in such a manner that its torque transmission capacity is adjusted as a function of a driving state of the vehicle, the torque transmission capacity of the clutch is increased for example with high traction power demand of the vehicle and/or with extremely unequal axle load distribution. In particular the clutch can be operated as a friction clutch, so that torque is transferred from the drive of a faster rotating vehicle axle to the drive of another vehicle axle, at which increased traction power demand exists. Accordingly higher traction power can be supplied to this other vehicle axle rotating more slowly. If the clutch is operated merely as a friction clutch and so only a part of the applied torque is transmitted, the advantages of variable rotational speed and torque distribution between the vehicle axles can be achieved at the same time. Also if the clutch is actuated in such a manner that only a maximum torque restricted to a limit value can be transmitted, the clutch is operated as a friction clutch at least whenever this limit value is exceeded so that a variable rotational speed and torque ratio between the vehicle axles is again present. Thus excessive tensions in the power train of the vehicle can be avoided.

In particular the clutch can be actuated in such a manner that it is disengaged in driving states, in which with engaged clutch high tensions in the power train would arise, such as for example when rounding tight bends, or its torque transmission capacity is reduced.

According to an advantageous further embodiment of the invention the torque transmission capacity of the clutch is adjusted as a function of at least one of the following driving state parameters of the vehicle:
steering angle of a steerable vehicle axle,
total transmitted torque of the drive system,
driving speed of the vehicle,
rotational speed of the wheels and/or the vehicle axles, and
slip on at least one of the wheels of the vehicle.

These parameters are inter alia determinant as to whether general engagement of the clutch and thus higher torque transmission capacity is necessary, or however whether due to the risk of tensions in the power train general disengagement of the clutch and thus a decrease in the torque transmission capacity is necessary. Total transmitted torque of the drive system in this case is understood to mean the sum of the torques arising on all wheels of the vehicle.

In particular, when rounding tight bends the turning radius of the front wheels is substantially greater than the turning radius of the rear wheels, so that tensions in the drive system would result if there is a rigid propulsive connection between the front axle and the rear axle of the vehicle. Therefore preferably with an increasing steering angle of a steerable vehicle axle, the torque transmission capacity of the clutch is preferably reduced.

If the total transmitted torque of the drive system is very high, this means that very high torques must be transmitted to individual or to several vehicle axles. In this case it is again expedient to increase the torque transmission capacity of the clutch and to engage the clutch, if necessary even fully.

With increasing driving speed of the vehicle, the traction power demand on the individual vehicle axles drops. It is therefore expedient with increasing driving speed of the vehicle to reduce the torque transmission capacity of the clutch.

Out of control spinning of a vehicle axle or the occurrence of heavy slip on one of the vehicle axles can be detected by way of the rotational speed ratio between front axle and rear axle. If a vehicle axle spins or heavy slip develops thereon, it is expedient to increase the torque transmission capacity of the clutch and to engage the clutch, if necessary even fully. Equally the torque transmission capacity of the clutch can be adjusted as a function of a slip, which is detected on at least one of the wheels of the vehicle.

According to an advantageous further embodiment the drive system comprises at least one sensor, by means of which at least one of the driving state parameters of the vehicle can be detected and is connected to the control unit in such a manner that the detected parameter can be sent to the control unit from the sensor. Thus the torque transmission capacity of the clutch can be controlled as a function of the driving state of the vehicle, preferably as a function of at least one of the parameters indicated above.

According to an advantageous further embodiment of the invention the clutch is a switchable clutch, wherein the first and the second vehicle axle are propulsively disconnected from each other in the disengaged condition of the clutch. Accordingly the first and the second motor can also be operated totally independently from each other so that completely independent rotational speed and torque distribution between the vehicle axles is possible.

According to an advantageous further embodiment at least one of the motors is a de-connectable motor, which can be disconnected from the propulsive connection to the associated vehicle axle, wherein regardless of whether the de-connectable motor is propulsively connected to the associated vehicle axle or propulsively disconnected therefrom, a propulsive connection can be selectively made and broken between the first and the second vehicle axle by the clutch. Because at least one of the motors is a de-connectable motor, at higher driving speeds one or more motors can be disconnected from the drive. Thus the friction losses, and in the case of hydraulic motors the leakage losses, are reduced. Since, regardless of whether the de-connectable motor is propulsively connected to the associated vehicle axle or propulsively disconnected therefrom, a propulsive connection can be selectively made and broken between the first and the second vehicle axle by the clutch, all vehicle axles can be driven together with high traction power over the entire driving speed range with extremely unequal axle load distribution. After the propulsive connection has been broken between the first and the second vehicle axle, the vehicle can also be driven by the associated motor exclusively via one vehicle axle, for example the rear axle, so as to save fuel.

According to an advantageous further embodiment at least one of the motors is an adjustable motor. This means that the rotational speed and the torque of this motor can be adjusted. Thus for example the drive power, delivered by this adjustable motor, can be reduced with increasing driving speed and then the motor can be disconnected from the power train.

According to an advantageous further embodiment the first and the second motor are hydraulic motors in each case, which are driven by a common adjustable hydraulic pump. The hydraulic motors and the hydraulic pump thereby form an infinitely variable transmission. As will become evident on the basis of the following description, such an infinitely variable transmission can also be formed by other motors, such as for example electric motors. Preferably the adjustable hydraulic pump is driven by a combustion engine and/or an electric motor (in the case of an electrically-driven vehicle). Particularly exclusively a combustion engine, exclusively an electric motor or a combination of combustion engine and electric motor can serve as the power source for the hydraulic pump. The hydraulic pump is adjusted as a function of the power demand, which the driver sets by corresponding movement of the accelerator pedal and/or a driving speed lever.

According to an advantageous further embodiment of the invention a power branched transmission is arranged between the power source, that is to say, between the combustion engine and/or the electric motor, and the hydraulic pump, a part of the drive power being mechanically transferred at the power branched transmission directly to at least one driven vehicle axle, preferably to the rear axle. Preferably the power branched transmission is formed as a planetary transmission or as planetary gears. Furthermore it may be provided for that the drive power for a PTO drive of the vehicle is branched off directly from the output shaft of the combustion engine and/or the electric motor. Alternatively the entire drive power delivered by the combustion engine and/or the electric motor can also be transmitted directly to the hydraulic pump. If the first and the second motor respectively are replaced by an electric motor, an electrical-mechanical power branched power transmission is present instead of a hydrostatic-mechanical power branched transmission. In the case of an electrical-mechanical power branched transmission when a combustion engine is the power source, the hydraulic pump must be replaced by an electric generator, in order to convert a part of the mechanical energy of the combustion engine into electricity and therefore to supply the two electric motors of the drive system with electricity.

According to an advantageous further embodiment of the invention the piston stroke of at least one of the hydraulic motors, preferably the hydraulic motor connected to a steerable vehicle axle, in particular the front axle, can be adjusted between a maximum value and zero. In the case of zero stroke torque is no longer transmitted to the output shaft of the hydraulic motor concerned. If the hydraulic motor is a de-connectable hydraulic motor, the connection to the power train can be broken and made in the case of a zero stroke particularly simply, free of torque and jerk, by the clutch. After disconnection of the hydraulic motor concerned the said motor will stop automatically. Additionally it may be provided for that the hydraulic motor, which can be disconnected from the power train, is stopped by means of a stopping device, for example a brake, or disconnected from its pressure supply by means of a valve.

Furthermore the present invention relates to a method for operating a drive system for vehicles with at least two drivable vehicle axles, wherein the drive system has an infinitely variable transmission with no intermediate axle differential comprising at least a first and a second motor. The first motor in this case is propulsively connected to a first vehicle axle and the second motor is propulsively connected to a second vehicle axle. Furthermore the drive system has a clutch, by which a propulsive connection can be made between at least the first and the second vehicle axle, wherein the clutch is adjustable in a range between an engaged position and a disengaged position. The method has the steps of detecting a driving state of the vehicle and adjusting the torque transmission capacity of the clutch as a function of the driving state of the vehicle detected by adjusting the position of the clutch.

The advantages relating to claim 1 mentioned above are achieved by the method according to the invention. Preferably the steps of detecting a driving state of the vehicle and adjusting the torque transmission capacity of the clutch as well as the control and detection operations associated therewith are carried out completely or partially by a control unit.

The design-engineering arrangements and further embodiments mentioned above in relation to the drive system according to the invention are correspondingly applicable in the case of the method according to the invention and in each case offer the advantages indicated above. Vice versa the method steps and activities indicated below can be equally implemented by the drive system according to the invention or by its further embodiments. For example this can be carried out in the case of the drive system according to the invention by a suitably constructed control unit.

As described above regarding the drive system, the torque transmission capacity of the clutch is preferably adjusted as a function of at least one of the following driving state parameters of the vehicle:

steering angle of a steerable vehicle axle,
total transmitted torque of the drive system,
driving speed of the vehicle,
rotational speed of the wheels and/or the vehicle axles, and
slip on at least one of the wheels of the vehicle.

Preferably the detection of the driving state of the vehicle includes the periodic or continuous detection of at least one of these parameters.

According to an advantageous further embodiment the torque transmission capacity of the clutch is adjusted as a function of the total transmitted torque of the drive system, wherein with low total transmitted torque of the drive system, preferably with a total transmitted torque in a range from substantially 0%-25% of the maximum total torque of the drive system, the clutch is preferably fully disengaged. The maximum total torque for the drive system is designated as the maximum torque which can be produced by the drive system. Thus with disengaged clutch the vehicle axles whose translation is variable to each other can be driven by the respective associated motors in the case of low total torque of the drive system. Thus all wheels of the vehicle can transmit drive power with light slip. Even when rounding bends and with various wheel diameters, which are caused for example by differing wear of the front wheels and rear wheels, tensions in the power train can be avoided.

According to an advantageous further embodiment the torque transmission capacity of the clutch is adjusted as a function of the total transmitted torque of the drive system, wherein in a range of average values for the total transmitted torque of the drive system, preferably with a total transmitted torque in a range from substantially 25%-75% of the maximum total torque of the drive system, the torque transmission capacity of the clutch is pre-set on a low initial value, preferably on a low initial value in the range from substantially 3%-10% of the maximum torque value, which can be transmitted by the clutch. In the range of average torques the case more frequently occurs that with unequal axle load distribution the traction power for the drive of the associated vehicle axle, delivered by a motor, is not sufficient and therefore the degree of engagement and thus the torque transmission capacity of the clutch must be increased. Pre-setting the torque transmission capacity of the clutch on a low initial value has the advantage that in this case faster response to this regulation is achieved.

According to a further embodiment of the invention the pre-set initial value of the torque transmission capacity of the clutch is proportional to the total transmitted torque of the drive system. According to an advantageous further embodiment of the invention the pre-set initial value of the torque transmission capacity of the clutch is additionally or alternatively a function of the steering angle of a steerable vehicle axle. Preferably the pre-set initial value of torque transmission capacity is reduced with increasing steering angle. Additionally or alternatively it may be provided for that the pre-set initial value of the torque transmission capacity of the clutch is a function of the driving speed of the vehicle. Preferably the pre-set initial value is reduced with increasing driving speed.

According to an advantageous further embodiment of the invention the first and the second motor are hydraulic motors in each case, wherein for detecting the total transmitted torque of the drive system the fluid pressure on the hydraulic motors is measured. For example the output torque of a hydraulic motor can be detected by measuring the fluid pressure on the inlet and on the outlet of this hydraulic motor. If the entire drive of the vehicle is produced alone by the first and the second motor, the total torque of the drive system can be determined simply by adding up the transmitted individual torques of the first and the second hydraulic motor.

According to an advantageous further embodiment of the invention upper and lower limit values for the rotational speed ratio of the vehicle axles are determined as a function of the respective steering angle of a steerable vehicle axle. Furthermore the torque transmission capacity of the clutch is adjusted in such a manner that whenever an upper limit value is exceeded or whenever a lower limit value is not reached, the torque transmission capacity of the clutch is increased. Thus it can be avoided that heavy slip develops on one of the vehicle axles and that this vehicle axle rotates substantially faster than the other vehicle axle and/or the other vehicle axles. Thus traction is improved and damage to the soil due to wheel spin is avoided to a large extent.

As explained above, the turning radii of the front wheels and the rear wheels differ as a function of the steering angle of a steerable vehicle axle. The limit values determined as a function of the respective steering angle are preferably aligned with the different turning radii of the wheels of a steerable vehicle axle and a non-steerable vehicle axle. Preferably the upper and lower limit values for the rotational speed ratio are determined in such a manner that in each case they lie above or below a value of the rotational speed ratio ideal for a certain steering angle. The ideal value corresponds to the rotational speed ratio when rounding a bend with the respective steering angle with no slip developing on the vehicle axles and the wheels. The distance of the upper and the lower limit value from the respective ideal value for different steering angles is preferably determined by a pre-set permissible slip difference of the vehicle axles, which preferably lies in the range from 4%-8%.

According to an advantageous further embodiment the upper and lower limit values for different steering angles are stored in a memory assigned to a control unit. Thus the limit values stored for the respective vehicle can be retrieved if necessary.

According to an advantageous further embodiment the upper and lower limit values are determined as a function of the rotational speed ratio of the vehicle axles, which is detected when setting off on a journey with low total transmitted torque of the drive system and preferably with narrow steering angles. Preferably the limit values are automatically re-established whenever a journey is made over a longer time with low total torque of the drive system and preferably with narrow steering angles. Thus the ideal values for the rotational speed ratio can be corrected or re-established and the upper and lower limit values can be adapted accordingly to the changed or re-established ideal value. Due to this method of regulation in particular various wheel diameters, which can result for example from differing wear of the wheels, or different tire pressures, can be considered. The upper and lower limit values are adapted accordingly to the actual conditions of the vehicle.

According to an advantageous further embodiment of the invention the torque transmission capacity of the clutch is continuously reduced at periodic time intervals and at the same time checked whether less torque transmission capacity is sufficient to comply with the limit values. Thus unnecessarily high degrees of engagement of the clutch can be avoided and the vehicle axles can be driven with as variable rotational speed and torque distribution as possible. Furthermore the manifestations of clutch wear are thereby reduced.

According to an advantageous further embodiment of the invention the torque output of the two motors can be adjusted independently, wherein preferably, with increasing driving speed of the vehicle, the torque output of the motor/motors, which is/are propulsively connected to a steerable vehicle axle, is reduced. Preferably the steerable vehicle axle is the front axle of the vehicle.

Accordingly the wheels of the steerable vehicle axle, and in particular the wheels of the front axle, at low driving speed, transmit a comparatively high traction power component and allow for rounding tight bends. At high driving speeds, however, single axle drive, preferably a rear-wheel drive, often desired for this speed range, can be realized.

According to an advantageous further embodiment of the invention the torque output of the motor, which is propulsively connected to a steerable vehicle axle, in particular a front axle, is adjusted and/or the clutch is actuated in such a manner that a traction power component, which is assigned to this steerable vehicle axle is dimensioned so that at low driving speeds it lies above the vehicle weight component loading this steerable vehicle axle. Low driving speed here is understood in particular to mean a speed range from 0-15 km/h. It is ensured by such controlling of the traction power component that in particular when rounding tight bends, the slip on the wheels of the front vehicle axle (or on the steerable vehicle axle) is somewhat greater than on the wheels of the rear vehicle axle (or the non-steerable vehicle axle). This leads to particularly narrow turning radii of the vehicle. In particular in the case of a steerable front vehicle axle the vehicle is pulled inwards into the bend by the slip developing. If the clutch is fully disengaged, the motor, which is propulsively connected to a steerable vehicle axle, only needs to be actuated accordingly. If torque is additionally transmitted by the clutch, the torque transmitted by the clutch should also be adjusted accordingly by the control unit. In particular the clutch should be actuated in such a manner that this is operated in the mode of operation of a friction clutch and torque is transferred from the drive of the front axle to the drive of the rear axle, without the mode of operation having to be changed, regardless of the rotational speed between front axle and rear axle.

According to an advantageous further embodiment of the invention the torque transmission capacity of the clutch is adjusted as a function of the total transmitted torque of the drive system, wherein with very high total transmitted torque of the drive system, preferably with a total transmitted torque in a range from substantially 75%-100% of the maximum total torque of the drive system, the clutch is preferably fully engaged. Thus the vehicle axles can be temporarily driven at a constant rotational speed ratio and up to 100% of the possible transmission output torque can be transmitted via a vehicle axle.

BRIEF DESCRIPTION OF THE DRAWINGS

Further characteristics and advantages of the invention are clear from the description of exemplary embodiments with reference to the appended drawings. The figures show.

DETAILED DESCRIPTION OF PREFERRED EMBODIMENTS

Figure 1:
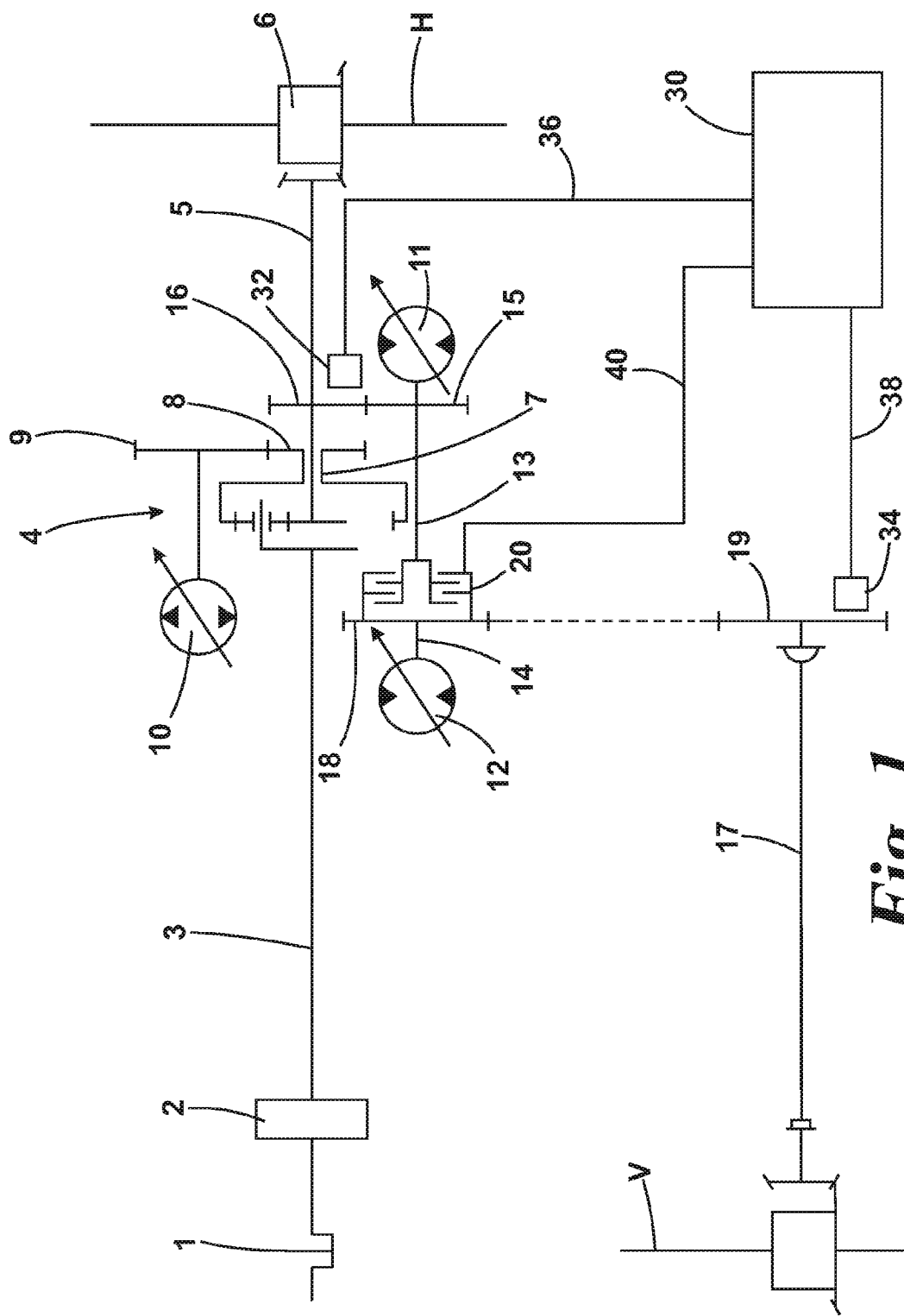
FIG. 1 is a schematic illustration of a drive according to a first embodiment of the present invention.

In FIG. 1 a drive is schematically illustrated according to a first embodiment of the present invention. In the case of this drive an internal-combustion engine 1 (or a crankshaft of the internal-combustion engine) is propulsively connected to the input shaft 3 of a power branched planetary driveline or transmission 4 by means of a clutch 2. The planetary transmission 4 is constructed in the form of a planetary gear-box and splits the power which is delivered via the input shaft 3 into a hydrostatic and into a mechanical power branch. In particular a first output shaft 5 of the planetary transmission 4 directly drives a differential gear 6 of a first rear axle H of the utility vehicle and thereby forms the mechanical power branch. A second output shaft 7 of the planetary transmission 4 drives an adjustable hydraulic pump 10 via a gear wheel stage 8, 9 and thereby forms the hydrostatic power branch. The hydraulic pump 10 in turn drives two parallel switched first and second hydraulic motors 11, 12 respectively via (not illustrated) hydraulic lines. The hydraulic motors 11, 12 in the case of this embodiment are formed as adjustable hydraulic motors in each case. The hydraulic motors 11, 12 comprise output shafts 13, 14 aligned flush with one another in each case. The output shaft 13 of the hydraulic motor 11 drives the first output shaft 5 of the planetary transmission 4 and thus the differential gear 6 of the first rear axle H of the utility vehicle via a gear wheel stage 15, 16. The output shaft 14 of the second hydraulic motor 12 drives the power train 17 leading to the second front axle V via a gear wheel stage 18, 19. Both output shafts 13, 14 can be coupled together by means of a clutch 20.

The hydraulic pump 10, as is generally known in the case of such drives, is adjusted as a function of the power demand, which the driver sets by corresponding movement of the accelerator pedal and/or a driving speed lever. Furthermore, driving states of the vehicle, such as for example standstill of the vehicle with the engine running, reverse and forward gear, can be adjusted and changed in a simple manner by regulating the hydraulic pump. The hydraulic motors 11, 12 are regulated via a (not illustrated) control unit.

The clutch 20, comprising a number of interleaved clutch plates clamped together by a hydraulic pressure, is adjustable with regard to its torque transmission capacity. By actuation of the parallel clutch plates the friction therebetween can be adjusted. For example, a reduction in the hydraulic clamping pressure reduces the grip therebetween and introduces a degree of slippage. The greater the slippage the lesser the torque transmitted by the clutch 20. The hydraulic clamping pressure can be varied between a level at which the clutch 20 is fully engaged with no slippage and a level at which the clutch 20 is fully disengaged with no torque transmitted.

To actuate the clutch 20 and to adjust its torque transmission capacity there is provided a control unit 30, which via sensors 32, 34 detects a driving state of the vehicle. The sensors 32 and 34 via signal wires 36, 38 are connected to the control unit 30 and convey data thereto concerning the driving state of the vehicle. In the embodiment illustrated the sensor 32 detects the rotational speed of the output shaft 5 of the planetary transmission 4. From this in turn the rotational speed of the rear axle H can be determined. The sensor 34 detects the rotational speed of the gear wheel 19. From this in turn the rotational speed of the front axle V can be determined.

A control line 40 leads from the control unit 30 to the clutch 20. In particular the control unit 30 can actuate the clutch 20 in such a manner that the clutch 20 is fully disengaged, fully engaged, or however transmits a certain torque or a certain amount of the applied torque. According to the invention the control unit 30 actuates the clutch 20 in such a manner that its torque transmission capacity is adjusted as a function of a driving state of the vehicle, which is detected in the present embodiment by the sensors 32 and 34. Preferably the control unit 30 in this case carries out one or more regulating steps, which are indicated above. The driving states explained below result as a function of the degree of engagement or disengagement.

With completely disengaged clutch 20 the drive power, available as a function of the respective operating conditions, is distributed to the hydraulic motors 11, 12 accordingly, and thus to the vehicle axles H, V. A variable rotational speed and torque distribution between front axle V and rear axle H can therefore be achieved.

When traveling over rough terrain with fully disengaged clutch 20 the case may arise that with extremely one-sided axle load and with high traction power demand the driven wheels lose their capacity to transmit traction power and spin out of control. As a function of the respective driving state of the vehicle the control unit 30 actuates the clutch 20 in such a manner that its degree of engagement is increased and a pre-determined torque or a pre-determined amount of the applied torque is transmitted by the clutch 20. Thus torque can be transferred from a faster rotating vehicle axle to a more slowly rotating vehicle axle. Because the clutch 20 is not fully engaged corresponding to the driving state of the vehicle, the advantages of variable rotational speed and torque distribution between front axle V and rear axle H still remain in place.

Even in the case of partial engagement of the clutch 20 or when the clutch 20 is operated as a friction clutch the case may arise that the torque produced on a vehicle axle is not sufficient. In this case the control unit 30 actuates the clutch 20 so that it is fully engaged. Thus both vehicle axles H and V can be driven temporarily at constant rotational speed ratio and up to 100% of the possible transmission output torque can be transmitted via an axle H or V.

Figure 2:
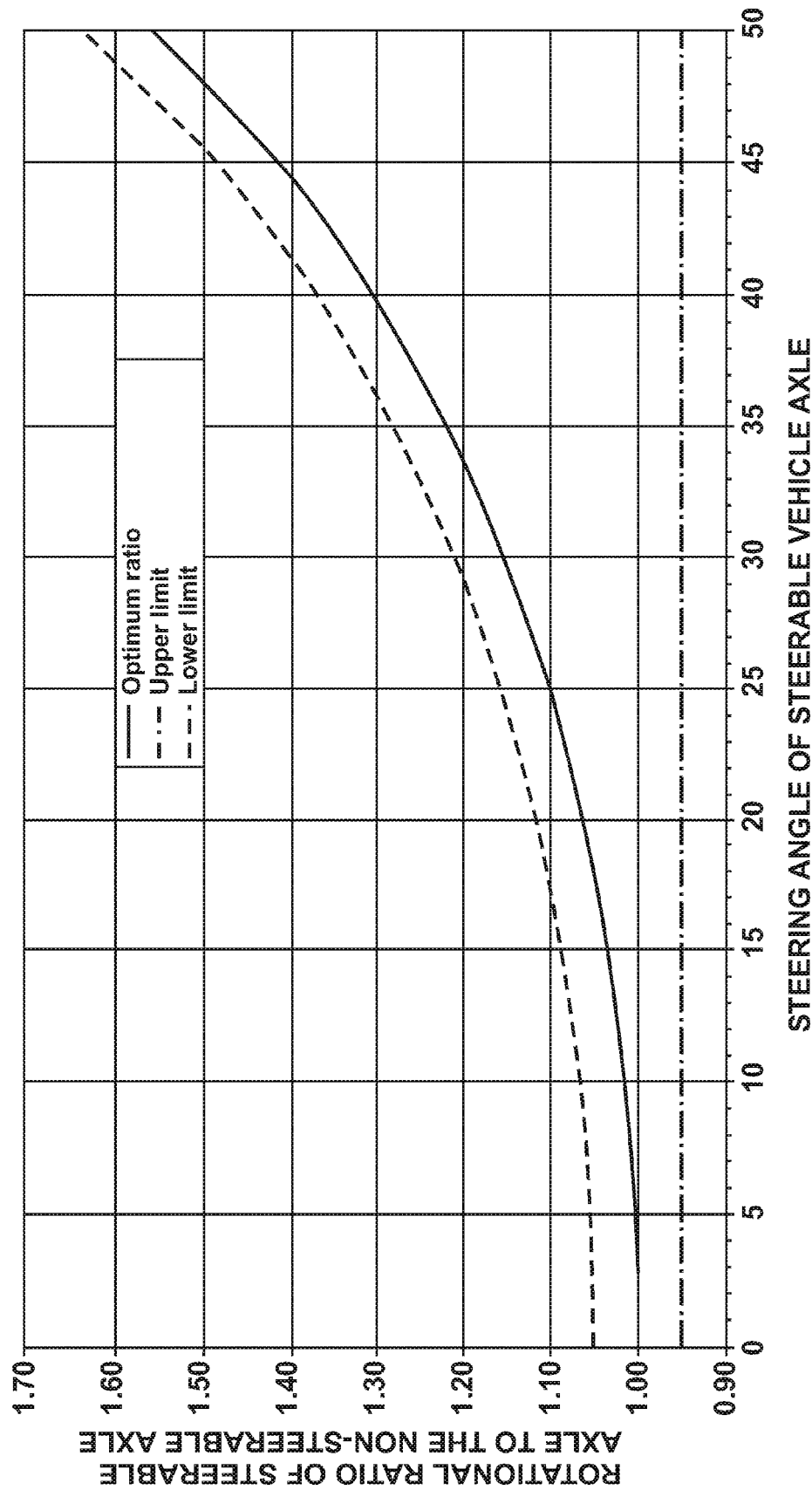
FIG. 2 is a diagram, wherein the ideal rotational speed ratio of the steerable vehicle axle to the non-steerable vehicle axle as well as the upper and lower limit values for the rotational speed ratio are applied as a function of the steering angle of the steerable vehicle axle.

In FIG. 2 with the solid line the optimum rotational speed ratio of a steerable vehicle axle to a non-steerable vehicle axle of a utility vehicle is plotted over the steering angle of the steerable vehicle axle. This optimum rotational speed ratio is reached if the vehicle rounds a bend with the respective steering angle and with no slip developing on the wheels of the vehicle. This optimum rotational speed ratio is called the ideal value below.

For example the ideal value is indicated as 1.0 for a steering angle of 0°, that is to say, when traveling straight ahead. This ideal value of 1.0 is applicable to such vehicles, wherein the diameters of the front wheels and the rear wheels are the same. If the diameters of the front wheels and the rear wheels are different, the rotational speed ratio must be adapted accordingly.

When rounding bends the wheels of a steerable vehicle axle cover a larger distance than the wheels of the non-steerable vehicle axle. Usually the front axle V is designed as a steerable vehicle axle. Accordingly the ideal value for the rotational speed ratio increments with an increasing steering angle of the steerable vehicle axle, as illustrated by the solid line in the diagram of FIG. 2.

Furthermore in the diagram of FIG. 2 the progression of an upper limit value for the rotational speed ratio is drawn as a broken line and the progression of a lower limit value of the rotational speed ratio is drawn as a dash-dotted line. The curve for the upper limit value in this case continuously runs above the curve for the optimum rotational speed ratio. The upward gradient of the curve corresponds to a large extent to the upward gradient for the optimum rotational speed ratio. The distance between the curve of the upper limit value and the curve of the optimum rotational speed ratio in the vertical direction amounts to approximately 0.05. The curve for the lower limit value continuously runs below the curve for the optimum rotational speed ratio. In the present case the curve for the lower limit value runs constantly at approximately 0.95.

Data tables corresponding to such a diagram can be stored for example in a memory of the control unit 30. On the basis of the rotational speed data actually measured by the sensors 32 and 34 it can be determined whether the rotational speed ratio still lies in the range between the respective upper limit value and the respective lower limit value. If the actual rotational speed ratio for the steering angle concerned lies outside this range, as explained above, the control unit 30 can actuate the clutch 20 in such a manner that its torque transmission capacity is increased.

In the following description of further exemplary embodiments of the present invention the same reference symbols, as were given for the drive shown in FIG. 1, are used for identical components. Also regarding the description of the same components reference is made to the description of FIG. 1. The differences of the further embodiments are primarily discussed in detail below in relation to the embodiment illustrated in FIG. 1.

Figure 3:
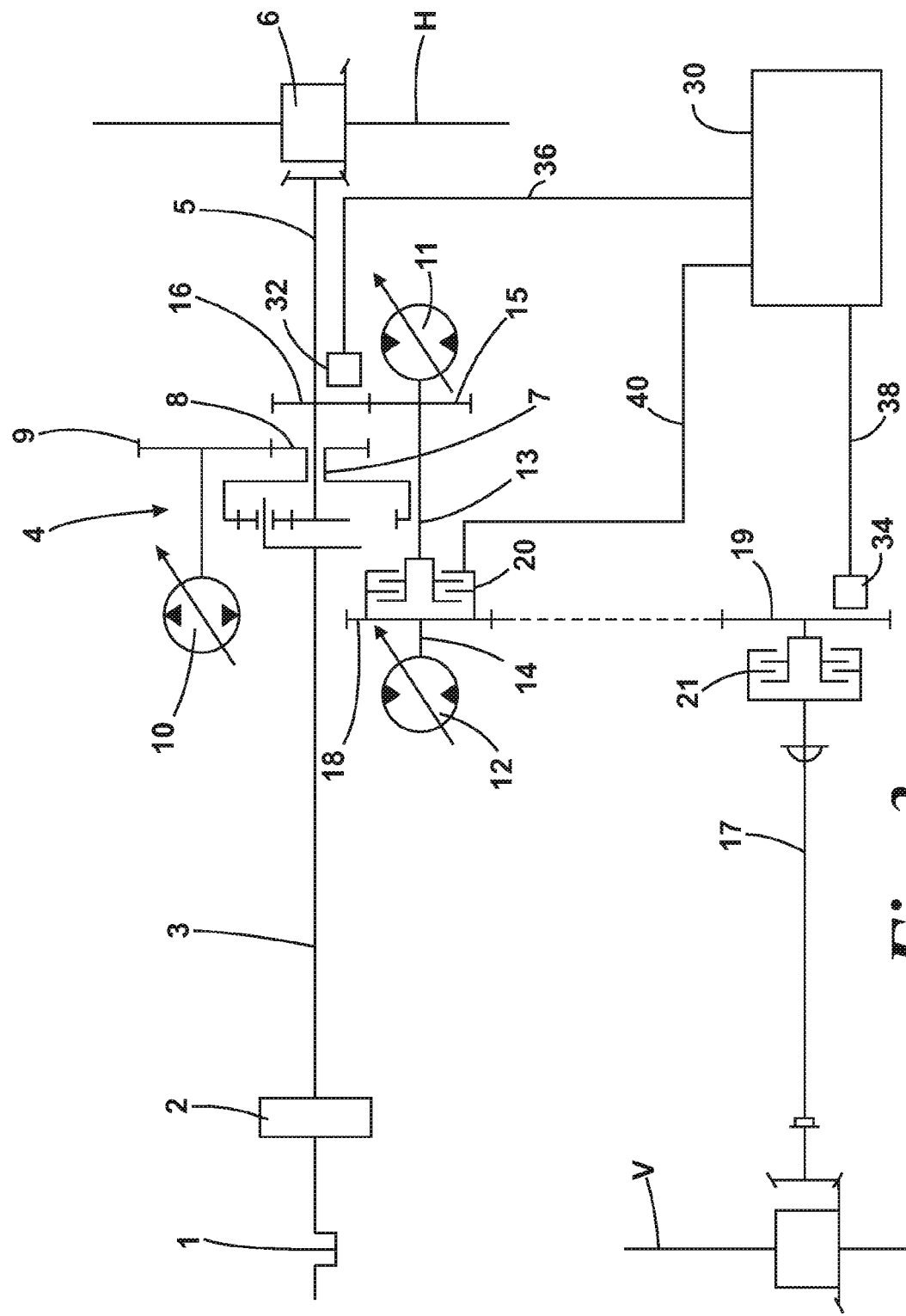
FIG. 3 is a schematic illustration of a drive according to a second embodiment of the invention.

In the case of the embodiment illustrated in FIG. 3 a disconnection clutch 21 is additionally provided in the power train 17 of the front axle V. As a result of this disconnection clutch 21 the front axle V can be disconnected from the drive by the hydraulic motor 12. If the clutch 20 is partly or fully engaged, the front axle V by disengaging the disconnection clutch 21 is additionally disconnected from the drive by the hydraulic motor 11 and from the mechanical branch of the planetary transmission 4.

Figure 4:
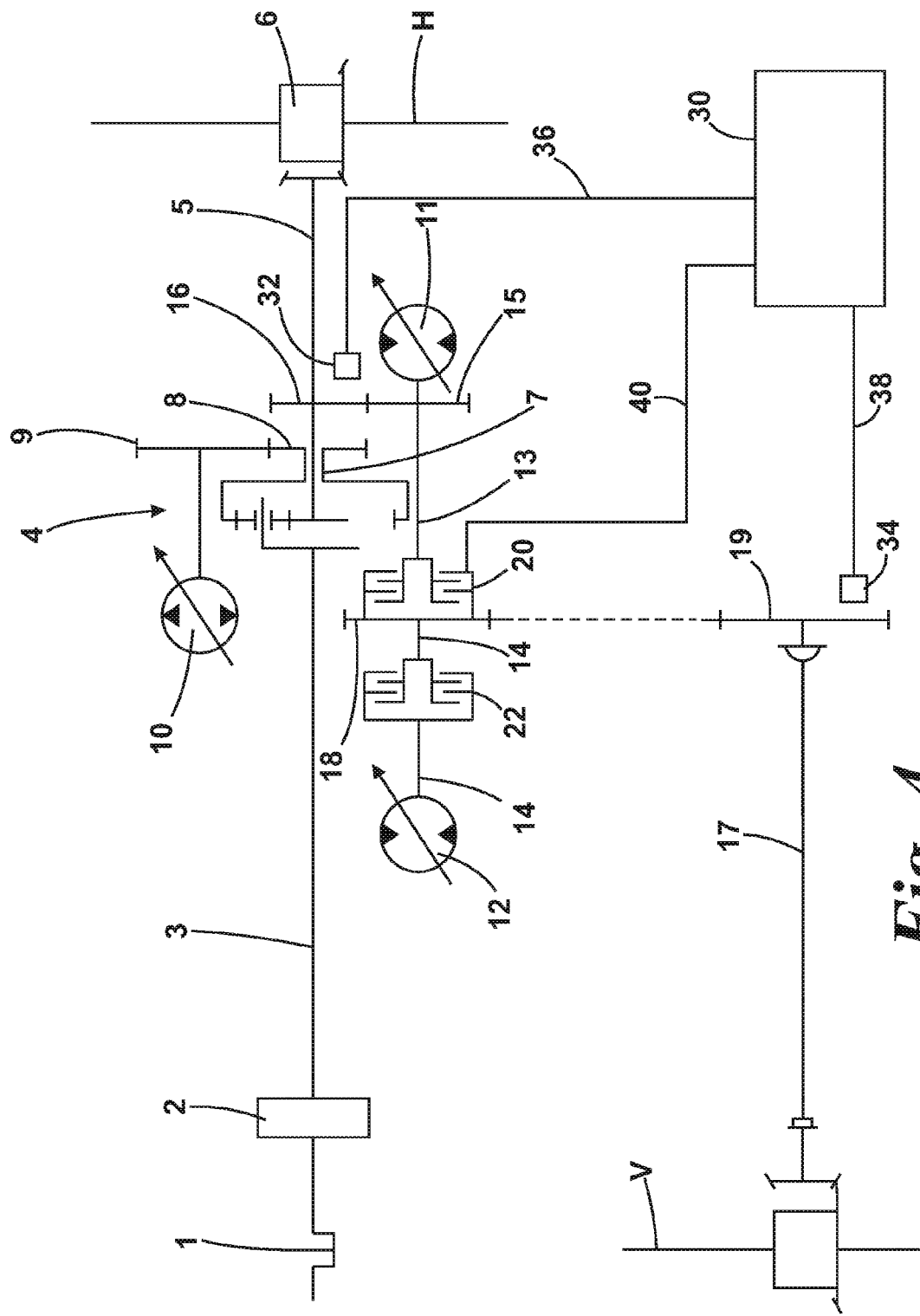
FIG. 4 is a schematic illustration of a drive according to a third embodiment of the present invention.

With the drive illustrated in FIG. 4 a further switchable clutch 22 is provided on the output shaft 14 of the hydraulic motor 12 in relation to the first embodiment illustrated in FIG. 1. The hydraulic motor 12 is designed accordingly as a de-connectable hydraulic motor. As is evident on the basis FIG. 4, this further clutch 22 can be disengaged and engaged independently from the position of the clutch 20. Accordingly regardless of the fact whether the de-connectable hydraulic motor 12 is propulsively connected to the associated vehicle axle (here: front axle V) by the further clutch 22 or propulsively disconnected therefrom by the clutch 20, which is adjustable with regard to its torque transmission capacity, a propulsive connection can be selectively made and broken between the front axle V and the rear axle H. Here it may be provided for that the further clutch 22 is also actuated by the control unit 30.

Figure 5:
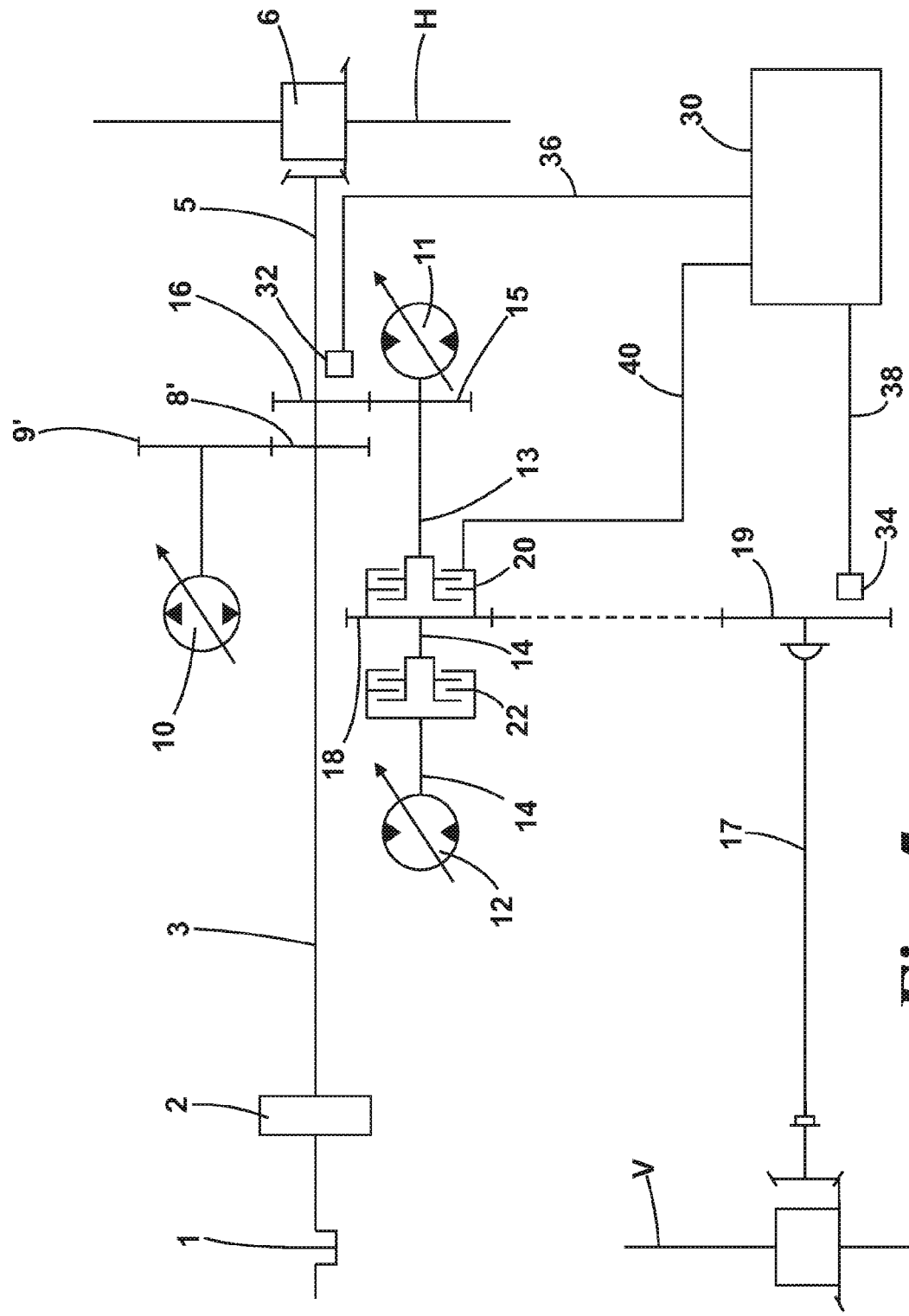
FIG. 5 is a schematic illustration of a drive according to a fourth embodiment of the invention.

With the drive illustrated in FIG. 5 no power branched transmission is provided in relation to the embodiment illustrated in FIG. 1. Rather the entire drive power of the input shaft 3 is transmitted via a gear wheel stage 8', 9' to the hydraulic pump 10. The adjustable hydraulic pump 10 in turn drives via the (not illustrated) hydraulic lines the two parallel switched hydraulic motors 11, 12. The hydraulic motor 11 is thereby constantly propulsively connected by the gear wheel stage 15, 16 to the rear axle H.

Figure 6:
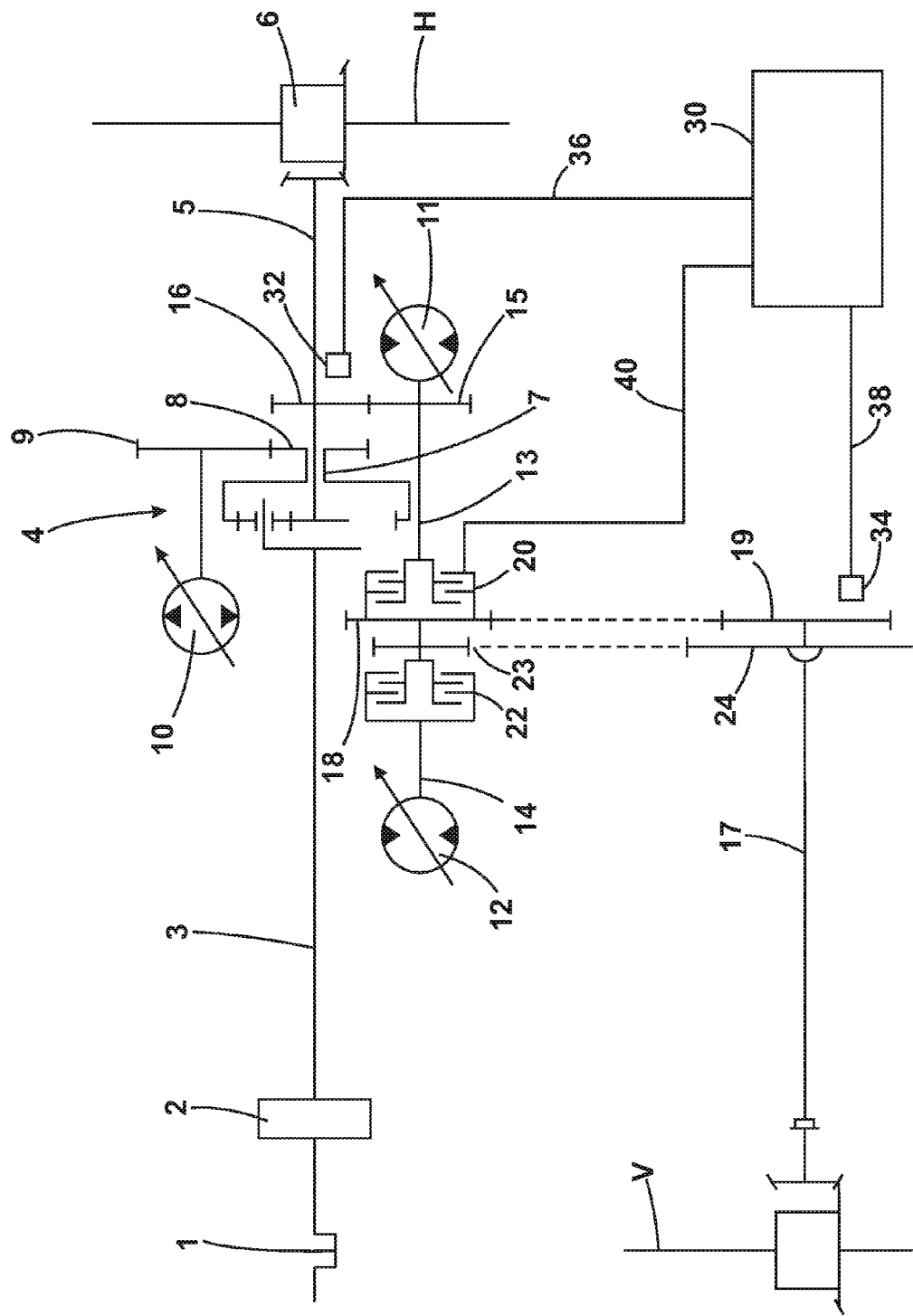
FIG. 6 is a schematic illustration of a drive according to a fifth embodiment of the present invention.

With the drive illustrated in FIG. 6 as with the drive illustrated in FIG. 1 the hydraulic motor 11 can be propulsively connected via the clutch 20 and the gear wheel stage 18, 19 to the power train 17 of the front axle V. In contrast to the embodiment illustrated in FIG. 1 the de-connectable hydraulic motor 12 is not propulsively connected via the further clutch 22 to the gear wheel stage 18, 19 but connected to a separately formed gear wheel stage 23, 24. The gear wheel stage 23, 24 in this case has a large translation, so that high torque can be transferred from the hydraulic motor 12 to the front axle V. Thus high torque can be transmitted to the front axle V by the de-connectable hydraulic motor 12 in particular at low driving speeds. At higher driving speeds the de-connectable hydraulic motor 12 is preferably disconnected from the power train 17 by the further clutch 22.

The present invention is not limited to the exemplary embodiments illustrated in the figures. In particular, different motors, such as for example electric motors, can also be used in place of the hydraulic motors 11 and 12 or pump 10 can be driven by an electric motor instead of an engine. According to the embodiment illustrated in FIG. 1 the drive power, delivered by an internal-combustion engine 1, in this case can be branched off at a planetary transmission 4, wherein a generator, which is provided in place of the hydraulic pump 10, can be driven by a branched part of the drive power. The electric energy produced by the generator in turn can be fed to the two electric motors, which are provided in place of the hydraulic motors 11 and 12. If the vehicle is driven exclusively by electricity, the at least two electric motors, which are provided in place of the hydraulic motors 11 and 12, can also be directly fed with electric energy, which is supplied by a battery or a fuel cell, etc.

In the introductory part of the description the steering angle of a steerable vehicle axle, the total transmitted torque of the drive system, the driving speed of the vehicle, the rotational speeds of the wheels and/or of the vehicle axles and the slip on at least one of the wheels of the vehicle are defined as driving state parameters. The control unit 30 can actuate the clutch 20 as a function of one or more of these parameters mentioned. The torque transmission capacity of the clutch can be controlled by further parameters of the driving state in addition to or alternatively to the parameters mentioned above.

In the figures only the sensors 32 and 34, by which the rotational speeds of the front axle and the rear axle can be determined, are illustrated. Alternatively or additionally, however, further sensors, for example for detecting the total transmitted torque, the driving speed of the vehicle, the steering angle of a steerable vehicle axle or the slip on one or more of the wheels of the vehicle, can also be provided.

I claim:

1. Drive system for vehicles with at least two drivable vehicle axles, the drive system comprising:

an infinitely variable transmission driven by a prime mover, the transmission having no intermediate axle differential and including a first motor which is propulsively connected to a first vehicle axle and a second motor which is propulsively connected to a second vehicle axle;

a clutch, by which a propulsive connection can be made between at least the first and the second vehicle axle, wherein the clutch is engageable in a range of torque transmitting conditions between a fully engaged position and a fully disengaged position, and a control unit configured to actuate the clutch in such a manner that its torque transmission capacity is adjusted as a function of a driving state of the vehicle sensed by a sensor and communicated to the control unit.

2. Drive system according to claim 1, wherein the torque transmission capacity of the clutch is adjusted as a function of at least one of the following driving state parameters of the vehicle sensed by an appropriate sensor connected with the control unit:

steering angle of a steerable vehicle axle,
total transmitted torque of the drive system,
driving speed of the vehicle,
rotational speed of the wheels and/or the vehicle axles, and
slip on at least one of the wheels of the vehicle.

3. Drive system according to claim 1, wherein a sensor is connected with the control unit to measure the steering angle of a steerable vehicle axle and the control unit adjusts the torque transmission capacity of the clutch as a function of the steering angle of a steerable vehicle axle, wherein for this purpose upper and lower limit values for the rotational speed ratio of the vehicle axles in each case are stored in a memory assigned to the control unit as a function of the steering angle, and wherein the control unit is formed in such a manner that whenever the upper limit is exceeded or the lower limit value is not reached, it increases the torque transmission capacity of the clutch.

4. Drive system according to claim 1, wherein at least one of the motors is an adjustable motor.

5. Drive system according to claim 1, wherein the first and the second motor are a hydraulic motor in each case, and wherein the first and the second hydraulic motor are driven by a common adjustable hydraulic pump.

6. Drive system according to claim 5, wherein the hydraulic pump is driven by a prime mover in the form of a combustion engine and/or an electric motor.

7. Drive system according to claim 6, further comprising a power branched transmission, the power branched transmission being a planetary transmission, being arranged between the combustion engine and/or the electric motor and the hydraulic pump, and in that a part of the drive power is mechanically transferred directly to at least one driven vehicle axle.

8. Drive system according to claim 5, wherein the hydraulic motor connected to at least one axle has a piston stroke which can be adjusted between a maximum value and zero.

9. Drive system according to claim 1, wherein the first and the second motor are formed in each case by an electric motor.

10. A vehicle comprising a drive system according to claim 1.

11. Method for the operation of a drive system for vehicles with at least two drivable vehicle axles, wherein the drive system has an infinitely variable transmission driven by a prime mover, the transmission having no intermediate axle differential and including a first motor which is propulsively connected to a first vehicle axle and a second motor which is propulsively connected to a second vehicle axle, and a clutch by which a propulsive connection can be made between at least the first and second vehicle axle; the method comprising:
- providing a sensor to detect driving state of the vehicle; and
- adjusting the torque transmission capacity of the clutch by varying the condition of engagement of the clutch in a range of torque transmission conditions between a fully engaged position and a fully disengaged position as a function of the driving state of the vehicle detected by the sensor.

12. Method according to claim 11, wherein the torque transmission capacity of the clutch is adjusted as a function of at least one of the following driving state parameters of the vehicle sensed by an appropriate sensor:
- steering angle of a steerable vehicle axle,
- total transmitted torque of the drive system,
- driving speed of the vehicle,
- rotational speed of the wheels and/or the vehicle axles, and
- slip on at least one of the wheels of the vehicle.

13. Method according to claim 11, wherein detecting the driving state of the vehicle comprises periodic or continuous detection of at least one of the following driving state parameters of the vehicle sensed by an appropriate sensor:
- steering angle of a steerable vehicle axle,
- total transmitted torque of the drive system,
- driving speed of the vehicle,
- rotational speed of the wheels and/or the vehicle axles, and
- slip on at least one of the wheels of the vehicle.

14. Method according to claim 11, wherein the torque transmission capacity of the clutch is adjusted as a function of the total transmitted torque of the drive system, wherein in a range of average values for the total transmitted torque of the drive system, with a total transmitted torque in a range of substantially from 25%-75% of the maximum total torque of the drive system, the torque transmission capacity of the clutch is pre-set on a low initial value, on an initial value in the range of substantially from 3%-10% of the maximum torque value which can be transmitted by the clutch.

15. Method according to claim 14, wherein the pre-set initial value of the torque transmission capacity of the clutch is proportional to the total transmitted torque of the drive system.

16. Method according to claim 14, wherein the pre-set initial value of the torque transmission capacity of the clutch is a function of the steering angle of a steerable vehicle axle, and wherein the pre-set initial value of the torque transmission capacity is reduced with increasing steering angle.

17. Method according to claim 14, wherein the pre-set initial value of the torque transmission capacity of the clutch is a function of the driving speed of the vehicle, and wherein the pre-set initial value of the torque transmission capacity is reduced with increasing driving speed.

18. Method according to claim 11, wherein the first and the second motor are hydraulic motors in each case, and in that for detecting the total transmitted torque of the drive system pressure sensor are provided for measuring the fluid pressures on the hydraulic motors which are indicative of the transmitted torque.

19. Method according to claim 11, wherein the torque output of the two motors can be adjusted independently from each other, wherein with increasing driving speed of the vehicle the torque output of the motor/motors, which is/are propulsively connected to a steerable vehicle axle is reduced.

20. Method according to claim 11, further comprising adjusting the torque output of the motor, which is propulsively connected to a steerable vehicle axle, and/or actuating the clutch in such a manner that a traction power component, which is assigned to this steerable vehicle axle is dimensioned so that at low driving speeds it lies above the vehicle weight component loading this steerable vehicle axle.

21. Method according to claim 11, wherein the torque transmission capacity of the clutch is adjusted as a function of total transmitted torque of the drive system, wherein with very high total transmitted torque of the drive system, with total transmitted torque in a range from substantially 75%-100% of the maximum total torque of the drive system, the clutch is fully engaged.

22. Method according to claim 11, wherein the steps of detecting a driving state of the vehicle and adjusting the torque transmission capacity of the clutch are carried out by a control unit.

23. A method for the operation of a drive system for vehicles with at least two drivable vehicle axles, wherein the drive system has an infinitely variable transmission with no intermediate axle differential comprising at least a first and a second motor, wherein the first motor is propulsively connected to a first vehicle axle and the second motor is propulsively connected to a second vehicle axle, and a clutch, by which a propulsive connection can be made between at least the first and second vehicle axle, and wherein the clutch is adjustable in a range between an engaged position and a disengaged position, the method comprising:
- detecting a driving state of the vehicle; and
- adjusting the torque transmission capacity of the clutch as a function of the driving state of the vehicle detected by adjusting the position of the clutch, wherein the torque transmission capacity of the clutch is adjusted as a function of the total transmitted torque of the drive system, and wherein the clutch is fully disengaged with a low total transmitted torque of the drive system, with a total transmitted torque in a range from substantially 0%-25% of the maximum total torque of the drive system.

24. A method for the operation of a drive system for vehicles with at least two drivable vehicle axles, wherein the drive system has an infinitely variable transmission with no intermediate axle differential comprising at least a first and a second motor, wherein the first motor is propulsively connected to a first vehicle axle and the second motor is propulsively connected to a second vehicle axle, and a clutch, by which a propulsive connection can be made between at least the first and second vehicle axle, and wherein the clutch is adjustable in a range between an engaged position and a disengaged position, the method comprising:
- detecting a driving state of the vehicle;
- adjusting the torque transmission capacity of the clutch as a function of the driving state of the vehicle detected by adjusting the position of the clutch;
- determining the upper and lower limit values for the rotational speed ratio of the vehicle axles as a function of the steering angle; and
- adjusting the torque transmission capacity of the clutch in such a manner that whenever an upper limit value is exceeded or whenever a lower limit value is not reached the torque transmission capacity of the clutch is increased.

25. Method according to claim 24, wherein the upper and lower limit values for the rotational speed ratio are determined in such a manner that in each case they lie above or below a value, ideal for a certain steering angle, of the rotational speed ratio, wherein the ideal value corresponds to the rotational speed ratio when rounding a bend with the respective steering angle with no slip developing on the vehicle axles and their wheels, and wherein with regard to the different steering angles the distance of the upper and the lower limit value from the ideal value is determined in each case by a pre-determined permissible slip difference of the vehicle axles, which lies in the range from 4%-8%.

26. Method according to claim 24, wherein the upper and lower limit values for different steering angles are stored in a memory, assigned to a control unit.

27. Method according to claim 24, wherein the upper and lower limit values are determined as a function of the rotational speed ratio of the vehicle axles, which is detected when setting off on a journey with low total transmitted torque of the drive system and with narrow steering angles.

28. Method according to claim 24, further comprising continuously reducing the torque transmission capacity of the clutch at periodic time intervals and simultaneously checking whether less torque transmission capacity is sufficient to comply with the limit values.

* * * * *